(12) United States Patent
Belverio

(10) Patent No.: US 10,840,849 B2
(45) Date of Patent: Nov. 17, 2020

(54) SOLAR CHARGER FOLDABLE CHAIR SIDE TABLE

(71) Applicant: Joseph L Belverio, West Caldwell, NJ (US)

(72) Inventor: Joseph L Belverio, West Caldwell, NJ (US)

(*) Notice: Subject to any disclaimer, the term of this patent is extended or adjusted under 35 U.S.C. 154(b) by 0 days.

(21) Appl. No.: 16/543,694

(22) Filed: Aug. 19, 2019

(65) Prior Publication Data

US 2020/0076351 A1 Mar. 5, 2020

Related U.S. Application Data

(60) Provisional application No. 62/724,278, filed on Aug. 29, 2018.

(51) Int. Cl.
| | |
|---|---|
| *H02S 10/40* | (2014.01) |
| *A47B 3/08* | (2006.01) |
| *H02S 20/30* | (2014.01) |
| *A47B 13/16* | (2006.01) |
| *A47B 3/06* | (2006.01) |

(52) U.S. Cl.
CPC .............. *H02S 10/40* (2014.12); *A47B 3/063* (2017.08); *A47B 3/0818* (2013.01); *A47B 13/16* (2013.01); *H02S 20/30* (2014.12)

(58) Field of Classification Search
CPC ....... A47B 3/063; A47B 3/0818; A47B 13/16; H02S 10/40; H02S 20/30
USPC ........................................................ 108/135
See application file for complete search history.

(56) References Cited

U.S. PATENT DOCUMENTS

| | | | | |
|---|---|---|---|---|
| 3,894,496 | A * | 7/1975 | Phillips | A47B 5/00 108/50.11 |
| 5,918,550 | A * | 7/1999 | Weir | A47B 5/06 108/152 |
| 7,290,746 | B1 * | 11/2007 | Macias | A47C 7/70 108/42 |
| 8,635,959 | B1 * | 1/2014 | Silknitter | A47G 23/0608 108/159.12 |
| 9,209,650 | B2 * | 12/2015 | Nita | H02J 7/35 |
| 9,859,748 | B2 * | 1/2018 | Wang | A47B 13/12 |
| 10,104,954 | B1 * | 10/2018 | Hamby | A47B 37/04 |
| 10,306,993 | B1 * | 6/2019 | Clarke | H02S 40/38 |
| 10,443,640 | B2 * | 10/2019 | Balk | F16B 7/105 |
| 10,511,185 | B2 * | 12/2019 | Ji | A47B 83/02 |
| 10,537,171 | B2 * | 1/2020 | Melaragno | A47B 13/16 |

(Continued)

*Primary Examiner* — Daniel J Troy
*Assistant Examiner* — Timothy M Ayres
(74) *Attorney, Agent, or Firm* — Stuart M. Goldstein

(57) ABSTRACT

A foldable chair side table has a snap-on/snap-off clamp which is designed for easy and simple installation on most foldable chairs. A leveling system is provided for ready adjustment to horizontally align the table in relation to the chair. The table is lightweight for ease of use and portability and comes equipped with an attached strap. It has a variety of unique features not found in prior side tables, including a solar powered charger having charging panels for electrically charging cell phones, tablets, and other electronic devices. The table also comes equipped with dual USB ports having a protective cover, a cup holder, a storage compartment, and rotatable leg members to allow placement of the side table on the ground, a table, or other flat surface.

11 Claims, 5 Drawing Sheets

(56) References Cited

U.S. PATENT DOCUMENTS

| | | | |
|---|---|---|---|
| 10,633,911 B2* | 4/2020 | Edelman | H01L 31/042 |
| 2016/0084454 A1* | 3/2016 | Svitak, Sr. | G08B 25/00 |
| | | | 362/183 |

* cited by examiner

SOLAR CHARGER FOLDABLE CHAIR SIDE TABLE

RELATED APPLICATION

This application claims the benefit of application Ser. No. 62/724,278, filed on Aug. 29, 2018.

BACKGROUND OF THE INVENTION

Side tables for beach chairs and other recreational foldable chairs are routinely used solely to provide a convenient surface for the placement of items such as sunglasses, cups, books, etc. While many of these tables are configured to be attached to and detached from the chairs, most tables are difficult to maintain in a secure position on the chair or are not easy to remove and carry when the chair itself is to be transported. Significantly, prior side tables do not have the capability to electrically charge cell phones, tablets, or other electronic devices. As most foldable chair users today operate such devices while they are actually on the beach or doing other outdoor activities, the inability to charge the devices is a distinct handicap.

SUMMARY OF THE INVENTION

It is thus the object of the present invention to provide a foldable chair side table which overcomes the limitations of prior tables, including enhancing the ease of use, effectively securing the table to a foldable chair, providing an electrical charging capability, and generally expanding the utility of the table.

The present invention is a foldable chair side table which has a snap-on/snap-off clamp which is designed for easy and simple installation on most common foldable chairs. A leveling system is provided for ready adjustment to horizontally align the table in relation to the chair. The side table itself is lightweight for ease of use and portability and comes equipped with an attached strap. Importantly, the side table comprises a variety of significant and unique features which are not found in prior side tables. Not the least of these features is a 9 volt/4 watt/4000 mAh output solar powered charger having charging panels for electrically charging cell phones, tablets, and other electronic devices. The table also comes equipped with dual USB ports having a protective cover, a cup holder, a storage compartment, and rotatable leg members to allow placement of the side table on the ground, a table, or other flat surface.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
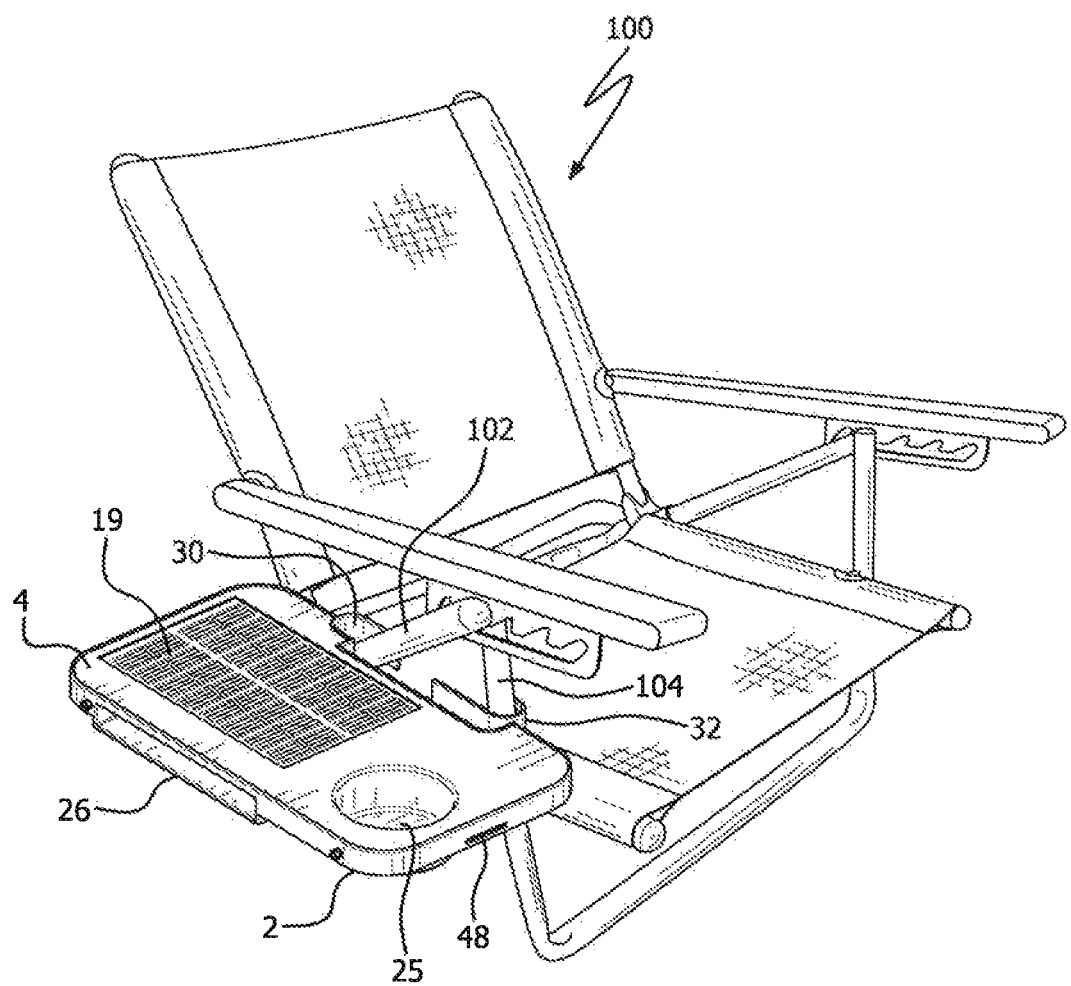
FIG. 1 shows the side table of the present invention secured to a foldable chair.

Side table 1 of the present invention is configured to be attached to supporting struts 102 and 104 of foldable chair 100. Side table 1 comprises table top member 2 having top surface 4, bottom surface 6, front wall 10, rear wall 12, first side wall 14, and second side wall 16. All the walls extend between top surface 4 and bottom surface 6. Horizontal ribs 3 and transverse ribs 5 provide rigid reinforcement for table top member 2.

First inset 18 is located within top surface 4 of table top member 2. A 9 volt/4 whatt/4000 mAh output solar charger 19, having a plurality of charging panels 20, is positioned within inset 18. Dual USB ports 22 and 23, located within rear wall 12, receive electricity from solar charger 19, via electrical connections 24 well known in the art, to provide electrical power to cell phones, tablets, and other electronic devices. Dual USB ports 22 and 23 are protected from ambient dirt and debris by cover 8.

Second inset 25 is also located within top surface 4 of table top member 2. This inset can be used for the placement of cups, sunglasses, or other outdoor related items. Additional storage space is provided by compartment 26, located beneath top surface 4 of table top member 2. Opening 28 of compartment 26 extends through side wall 16.

Figure 2:
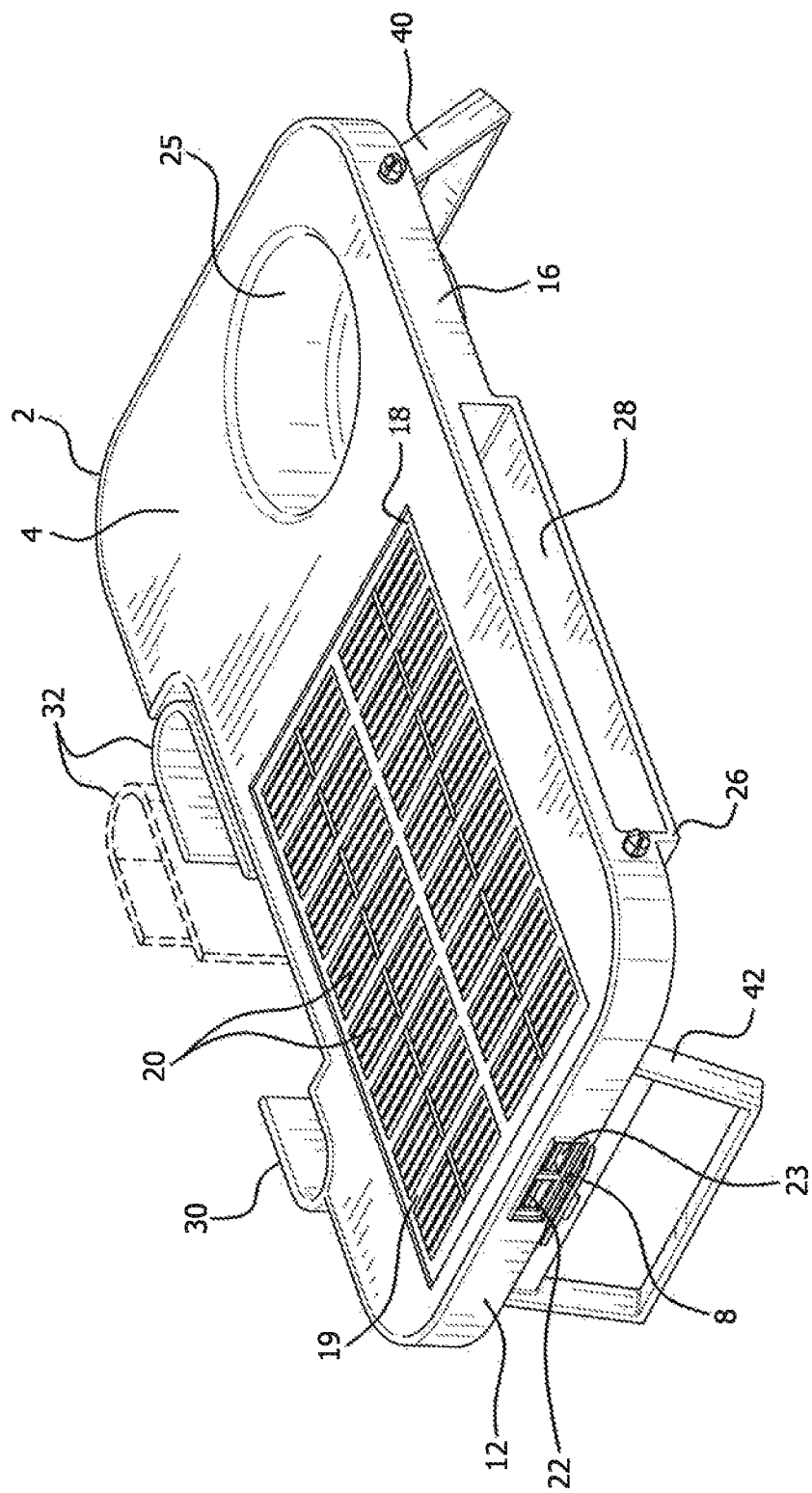
FIG. 2 is a top perspective view of the side table of the present invention with its leg members extended outward.
Figure 3:
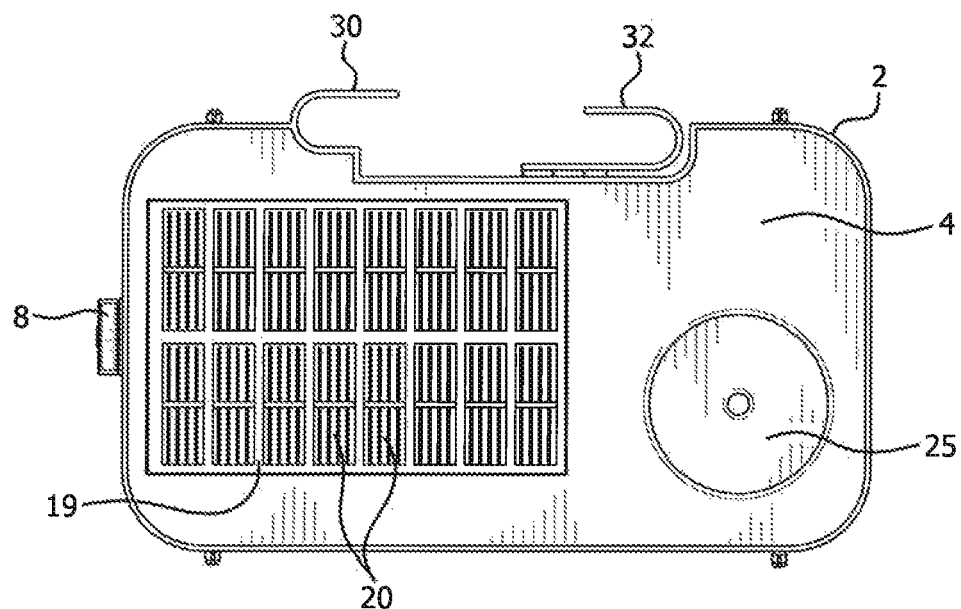
FIG. 3 is a top view of the side table of the present invention.
Figure 4:
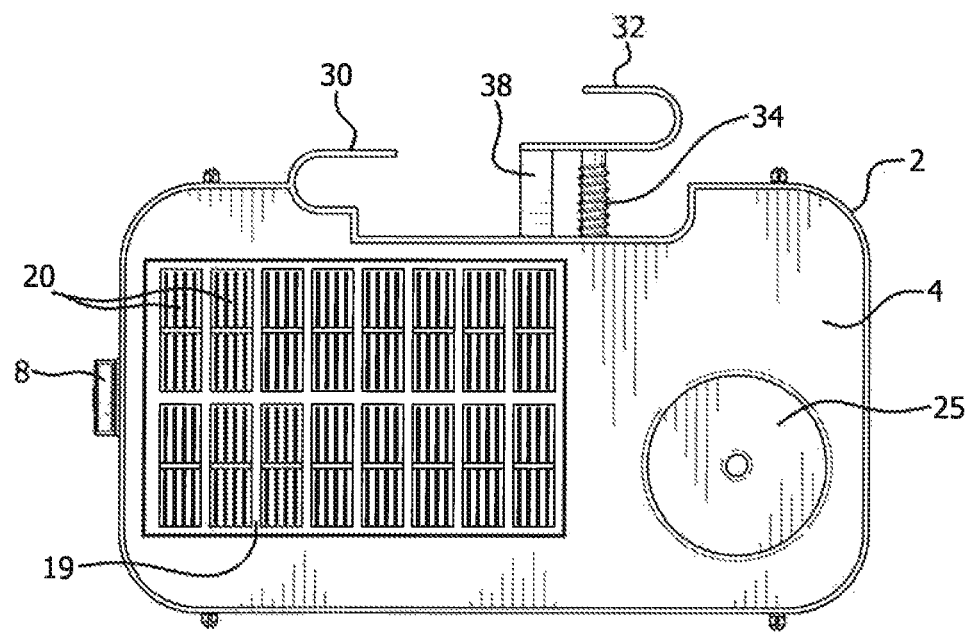
FIG. 4 is a top view of the side table of the present invention with its adjustable clamp extended.
Figure 5:
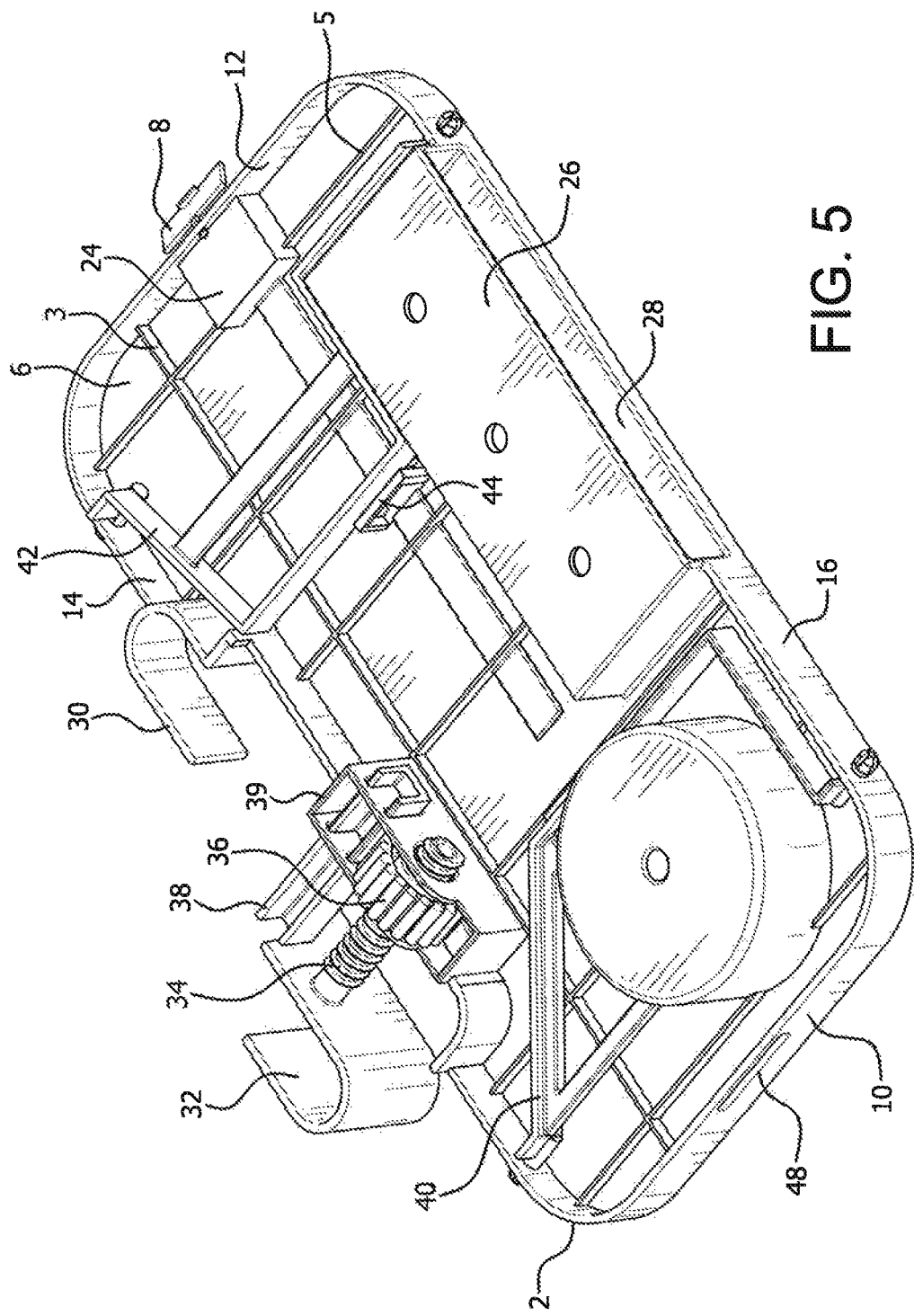
FIG. 5 is a bottom perspective view of the side table of the present invention with its adjustable clamp extended and leg members rotated down.
Figure 6:
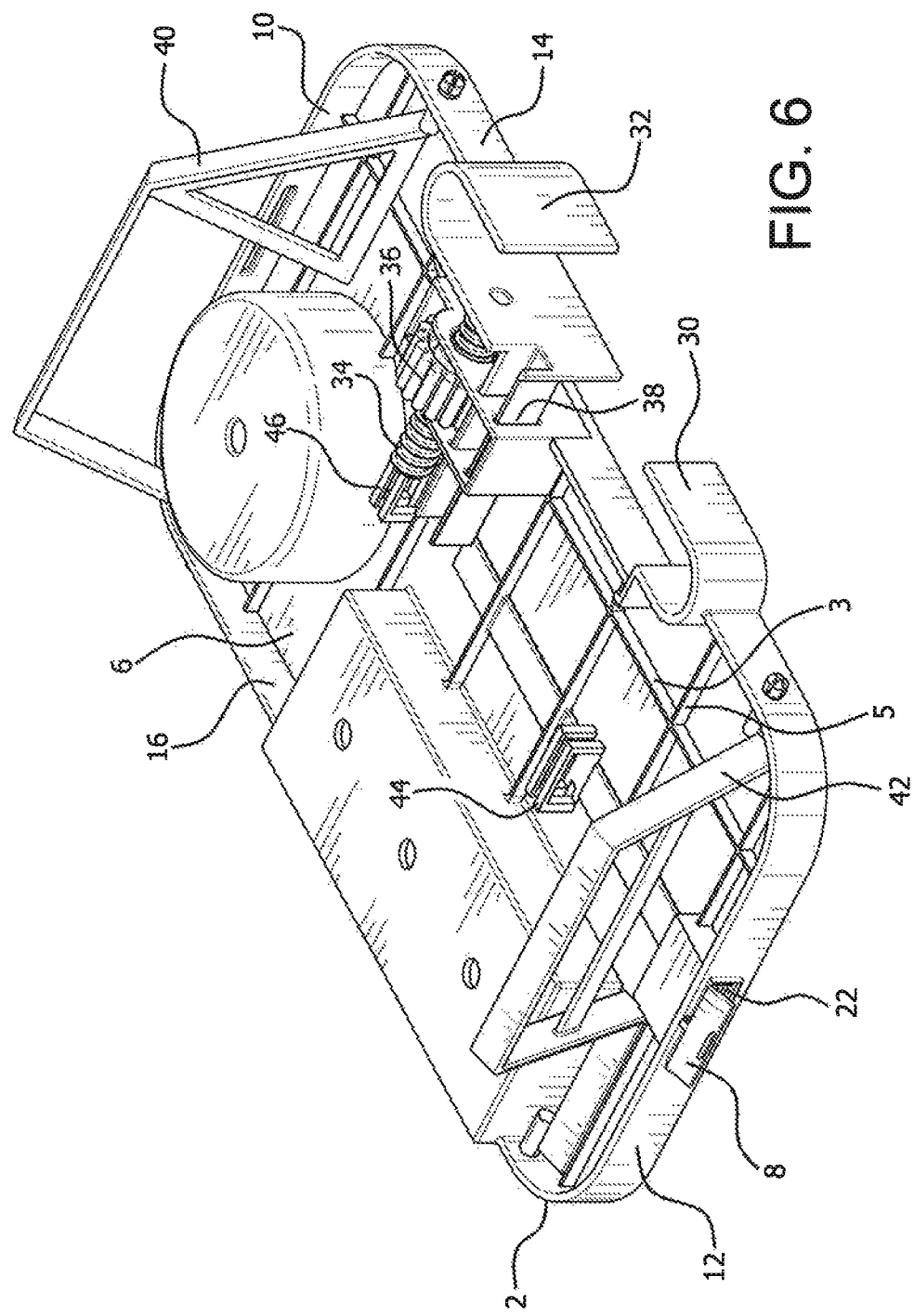
FIG. 6 is a bottom perspective view of the side table of the present invention shown with its adjustable clamp retracted and its leg members extended outward.

Table top member 2 of side table 1 is secured to supporting struts 102 and 104 of foldable chair 100 by attachment means in the form of U-shaped clamps 30 and 32. Clamp 30, extending from side wall 14, is stationary. Clamp 32 is connected to table top member 2 by means of leveling screw 34 and supported, in part, by guide members 38 extending from the clamp through housing 39 (See FIGS. 5 and 6). Table top member leveling means comprises leveling screw 34 and leveling wheel 36, which are also supported within housing 39. In use, leveling wheel 36 is rotated, which in turn rotates leveling screw 44 outwardly from table top member 4 to adjust the position of clamp 32 and, therefore the horizontal position of the table top member (See FIGS. 2, 4, and 5). These leveling elements ensure that table top member 4 can easily be adjusted on supporting structures 102 and 104, so that side table 1 is maintained in a horizontal plane.

Leg members 40 and 42 are connected to side walls 16 and 18. The leg members are rotatable from a first, folded position wherein they are adjacent to bottom surface 6 (see FIG. 5), to a second position wherein the leg members are rotated downwardly and outwardly in relation to table top member 4, such that they extend outwardly from the bottom surface (see FIG. 6). In the second position, side table 1 can be placed on the ground, a table, or similar flat surface. Locking members in the form of dual brackets 44 and 46 secure leg members 40 and 42 in the first position, adjacent to bottom surface 6.

For transporting side table 1, strap 48, located on front wall 10, can be used to attach the side table to the outside of a foldable chair or other item.

Thus, it is evident that side table 1 of the present invention provides the user with a variety of readily accessible features which makes it convenient to store various items, charge electrical devices, and easily transport the side table for ease of set up and use.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A side table for a foldable chair, said side table comprising:
   a table top member having a top surface, a bottom surface, a front wall, a rear wall, and first and second side walls extending between the front and rear walls, all said walls extending between the top and bottom surfaces;
   a first inset located within the top surface;
   a solar charger having exposed charging panels positioned within the first inset;
   attachment means for securing the table top member of the side table to a foldable chair wherein the attachment means comprises a stationary U-shaped clamp having two arm members forming the U, an adjustable U-shaped clamp moveable outward from and inward toward the table top member, said adjustable clamp having two arm members forming the U;
   leveling means comprising a leveling screw and a leveling wheel for adjusting the horizontal plane of table top member of the side table, said screw being attached solely and directly to one of the arm members of the adjustable clamp; and
   at least one USB port located within the rear wall for the connection of an electronic device to the solar charger.

2. The side table as in claim 1 further comprising a second inset within the top surface.

3. The side table as in claim 1 further comprising dual leg members connected to the first and second side walls, the legs being rotatable from a first position wherein they are adjacent to the bottom surface of the table top member to a second position wherein the leg members are rotated downward and outwardly, such that they extend outwardly from said bottom surface.

4. The side table as in claim 3 further comprising locking means for securing the leg members in said first position.

5. The side table as in claim 4 wherein the locking means comprises dual brackets.

6. The side table as in claim 1 further comprising a storage compartment located beneath the top surface of the table top member.

7. The side table as in claim 6, wherein said storage compartment has an opening extending through one of the two side walls.

8. The side table as in claim 1 further comprising a strap located on the front side wall for transporting the side table.

9. The side table as in claim 1 wherein the arm members of the adjustable clamp are parallel to and, at all times, in spaced relation to the first side wall.

10. The side table as in claim 1 wherein the arm members of the stationary clamp are parallel to the first side wall and one of the arm members extends from the first side wall.

11. The side table as in claim 10 wherein the arm members of the adjustable clamp are parallel to and, at all times, in spaced relation to the first side wall.

\* \* \* \* \*